United States Patent
Kim

(10) Patent No.: US 10,236,940 B2
(45) Date of Patent: Mar. 19, 2019

(54) FRAME FOR DEVICE CAPABLE OF TRANSMITTING ELECTRIC WAVE AND MANUFACTURING METHOD OF THE SAME

(71) Applicant: Jae Beom Kim, Seoul (KR)

(72) Inventor: Jae Beom Kim, Seoul (KR)

( * ) Notice: Subject to any disclaimer, the term of this patent is extended or adjusted under 35 U.S.C. 154(b) by 0 days.

(21) Appl. No.: 15/702,762

(22) Filed: Sep. 13, 2017

(65) Prior Publication Data

US 2018/0076854 A1    Mar. 15, 2018

(30) Foreign Application Priority Data

Sep. 13, 2016 (KR) .......... 10-2016-0117806
Aug. 30, 2017 (KR) .......... 10-2017-0109988

(51) Int. Cl.
| H04B 5/00 | (2006.01) |
| B32B 15/08 | (2006.01) |
| H02J 7/00 | (2006.01) |
| H02J 7/02 | (2016.01) |
| H04M 1/02 | (2006.01) |

(52) U.S. Cl.
CPC ........... *H04B 5/0037* (2013.01); *B32B 15/08* (2013.01); *H02J 7/0042* (2013.01); *H02J 7/025* (2013.01); *H04B 5/0081* (2013.01); *H04M 1/026* (2013.01); *B32B 2457/00* (2013.01); *H04M 2250/04* (2013.01)

(58) Field of Classification Search
CPC ....................................................... H04M 1/03
USPC ....................................................... 455/575.1
See application file for complete search history.

(56) References Cited

U.S. PATENT DOCUMENTS

| 6,035,180 | A | * | 3/2000 | Kubes | ................ G06F 3/03547 |
| | | | | | 455/575.1 |
| 2002/0072335 | A1 | * | 6/2002 | Watanabe | ........... H04M 1/0214 |
| | | | | | 455/575.1 |
| 2010/0291361 | A1 | * | 11/2010 | Hsu | ........................ B44C 1/228 |
| | | | | | 428/203 |
| 2014/0057686 | A1 | * | 2/2014 | McCaughey | ........ H04B 1/3838 |
| | | | | | 455/575.5 |
| 2016/0101599 | A1 | * | 4/2016 | Kaiser | ...................... B21B 1/22 |
| | | | | | 428/596 |

(Continued)

FOREIGN PATENT DOCUMENTS

| KR | 10-2014-0008130 A | 1/2014 |
| KR | 10-2014-0008273 A | 1/2014 |
| KR | 10-2014-0104242 A | 8/2014 |

(Continued)

*Primary Examiner* — Wen W Huang
(74) *Attorney, Agent, or Firm* — Park, Kim & Suh, LLC

(57) ABSTRACT

Disclosed herein is a frame including a metal layer and being capable of transmitting electric waves that may be applied to a device including a wireless charging module or a wireless communication module, and wherein each of the modules may be selected from at least one of a charging transmitter, a charging receiver, and a near field communication module. Herein, for example, a mobile device including at least one wireless charging receiver and being capable of performing wireless charging accordingly, may be expected to perform the wireless charging more easily despite having its external feature configured of a metallic material having a more excellent and luxurious texture and having a more enhanced durability.

15 Claims, 9 Drawing Sheets

(56) References Cited

U.S. PATENT DOCUMENTS

2016/0118712 A1\* 4/2016 Gu .................. B29B 11/04
  343/702
2017/0077597 A1\* 3/2017 Gong ................ H04W 4/008

FOREIGN PATENT DOCUMENTS

KR  10-2014-0113147 A  9/2014
KR  10-2016-0096498 A  8/2016

\* cited by examiner ature in the mobile devices. Accordingly, manufacturers are gradually seeking to replace the frames of their mobile devices to metal frames, which can provide diverse texture and more enhanced durability. Evidently, metal frames may be disadvantageous in the aspect of weight as compared to the plastic frames. However, due to the excellence in the design provided by the metal frame, the difference in weight between the two materials may not be significant.

FRAME FOR DEVICE CAPABLE OF TRANSMITTING ELECTRIC WAVE AND MANUFACTURING METHOD OF THE SAME

This application claims the benefits of the Korean Patent Application No. 10-2016-0117806 filed on Sep. 13, 2016 and the Korean Patent Application No. 10-2017-0109988 filed on Aug. 30, 2017, which are hereby incorporated by references as if fully set forth herein.

BACKGROUND OF THE INVENTION

Field of the Invention

The present invention relates to a frame for a device capable of performing wireless charging, near field communication, power transmission, and so on, and, most particularly, to a frame capable of easily transmitting electric waves (or radio waves), such as performing near field communication, power transmission, and so on, and a manufacturing method of the same, wherein the frame is configured metal and polymer being alternately layered, so as to not only improve a sense of beauty in the metallic external features of the device but also to achieve a relatively enhanced durability of the plastic material, and wherein the frame is configured of metal having a thickness or width that is equal to or less than a skin depth, so that resistance caused by the metal layer can be decreased, thereby facilitating the performance of wireless charging.

Discussion of the Related Art

The wireless charging technology has evolved at a remarkable rate and is being extensively applied in diverse types of appliances including mobile phones. Such wireless charging may also be referred to as non-contact charging and may be broadly divided into two different types: a method using electromagnetic induction and a method using magnetic resonance. The electromagnetic induction type charging technology corresponds to a method of charging batteries by generating an induced current between a charging pad and two coils provided inside a mobile phone. And, the charging method using magnetic resonance corresponds to a method of performing charging by sending out power through the same frequency to a transmitting/receiving end that is located at a distance 1 to 2 meters (m) away from the charging system.

The electromagnetic induction type charging method may be used in mobile devices, such as mobile phones, laptop computers, and so on, and also in electric vehicles. And, as the currently most widely used technology, the electromagnetic induction type charging method may use frequencies ranging from several hundreds of kilohertz (kHz) to several tens of megahertz (MHz). And, most particularly, in order to perform wireless charging of mobile phones, the electromagnetic induction type charging method generally uses frequencies within a range of 100 to 300 kHz.

Meanwhile, manufacturers of mobile devices, such as mobile phones, have consistently developed their technologies in order to maximize the performance of their mobile devices and, eventually, have achieved their goal of realizing a state-of-the-art mobile device technology. Therefore, it has become more difficult for the manufacturers to create their own distinguished functions that are related to the performance of the device. Accordingly, the manufacturers are becoming more focused on the design of their mobile devices, and, therefore, the selection of the material for a frame configuring the external feature of the mobile device has become one of the most important issues.

More specifically, until recently, in order to manufacture light-weight mobile devices, the manufacturers have mostly fabricated their mobile devices by using plastic material. However, due to the characteristics of the plastic material, there were limitations in realizing high-quality texture in the mobile devices. Accordingly, manufacturers are gradually seeking to replace the frames of their mobile devices to metal frames, which can provide diverse texture and more enhanced durability. Evidently, metal frames may be disadvantageous in the aspect of weight as compared to the plastic frames. However, due to the excellence in the design provided by the metal frame, the difference in weight between the two materials may not be significant.

Since metal acts as a shielding material that blocks out frequency band that is used for diverse means of payment, such as Samsung Pay, and so on, which are mostly equipped in the mobile device, and for performing wireless power transmission, problems of being incapable of performing or having difficulty in performing wireless charging, near field communication, and so on, may occur.

More specifically, as one of the functions included in the wireless charging technology, there exists a function of detecting metallic objects potentially causing danger that are within a close range of the wireless charging receiver via digital feedback between the wireless charging receiver and transmitter. This function is referred to as foreign object detection (FOD), and, when a foreign object is detected, the power transmission is suspended.

Until recently, the frame for devices that are mostly used has been fabricated by using plastic material. Since a power line cannot pass (or cannot be transmitted) through insulators (or non-conductors), such as plastic, heat may not be generated, or an extremely low level of heating may be performed. Accordingly, the foreign object detection function may not be performed. Therefore, as long as the plastic frame is applied to the mobile devices, problem may not occur in the wireless power transmission.

Heat (temperature) that is generated from a foreign object (metal) may correspond to a standard for detecting foreign objects when electronic magnetic waves are generated from a coil. And, when detecting the temperature that is generated from the foreign object (metal), as described above, and when the detected temperature is equal to or higher than a predetermined standard (generally 60° C.), the wireless charging system stops (or interrupts) the power transmission. Accordingly, there lies a disadvantage of not being able to apply a frame configured of a metallic material to a device that is equipped with a wireless charging transmitter or receiver.

Therefore, in order to comply with the mainstreaming of adopting metal frames to the external features of diverse devices, such as mobile devices, research and development of a frame enabling wireless charging despite the usage of a metal frame is urgently required.

SUMMARY OF THE INVENTION

Accordingly, the present invention is directed to a frame for a device capable of transmitting electric waves and a manufacturing method of the same that substantially obviate one or more problems due to limitations and disadvantages of the related art.

A technical object of the present invention is to provide a frame for a device capable of transmitting electric waves and a manufacturing method of the same that allow, for example, a mobile device including at least one wireless charging receiver and being capable of performing wireless charging accordingly, to perform the wireless charging more easily despite having its external feature configured of a metallic material having a more excellent and luxurious texture and having a more enhanced durability.

Also, another technical object of the present invention is to provide a frame for a device capable of transmitting electric waves and a manufacturing method of the same that can add a new sense of beauty in its external features by layering polymer between metal layers, and that can, most particularly, add metallic texture to the frame, in case the frame is configured of extremely thin polymer, and that can transmit electric waves despite the metallic properties of the frame.

Yet another object of the present invention is to provide a frame for a device capable of transmitting electric waves and a manufacturing method of the same that can implement a simple manufacturing method of the frame, which is configured by alternately layering metal and polymer.

A further object of the present invention is to provide a frame for a device capable of transmitting electric waves and a manufacturing method of the same that can reduce the resistance caused by the metal, when transmitting electric waves, so as to reduce thermal radiation (or heat radiation), by configuring the metal to have a thickness equal to or less than the skin depth.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an exemplary embodiment of the present invention, provided herein is a frame including a metal layer and being capable of transmitting electric waves, including an alternated layering of at least one metal layer and at least one polymer layer, wherein the at least one metal layer and the at least one polymer layer may be alternately layered on a surface of the frame.

Preferably, the frame may be applied to a device including a wireless charging module or a wireless communication module, and each of the modules may be selected from at least one of a charging transmitter, a charging receiver, and a near field communication module.

Preferably, the frame may be installed at a position corresponding to a main transmitting direction or a main receiving direction of the wireless charging module or the wireless communication module.

Preferably, multiple frames may be deposited one over another, wherein an insulating layer may be formed on at least a portion between each frame, and wherein the insulating layer may correspond to any one of air, a film, and a coating layer.

Preferably, each of an upper frame and a lower frame may be configured to have a different color, and the color of the lower frame may be capable of being recognized through a polymer layer of the upper frame.

Preferably, when the upper frame and the lower frame are deposited one over another, a polymer layer of the lower frame may be configured to match a lower surface of a metal layer of the upper frame, thereby allowing the polymer layer being formed on the lower frame to be concealed.

Preferably, the metal layer may have a thickness less than or equal to a skin depth.

Preferably, the thickness of the metal layer may be equal to the thickness of the frame or equal to a value measured from a perpendicular direction to a longitudinal direction of a surface of the metal layer.

Preferably, the frame may be installed at a position corresponding to a main transmitting and/or receiving direction of wireless power and wireless communication in at least one device capable of performing wireless power transmission and wireless communication.

Additionally, in another aspect of the present invention, provided herein is a manufacturing method of a frame including a metal layer and being capable of transmitting electric waves including a first step of forming a deposition layer configured of a metal layer and a polymer layer by laminating a metal layer and a polymer layer each having a plate form, or by forming a metal layer on a polymer layer or a polymer layer on a metal layer, a second step of forming a roll by winding the deposition layer, and a third step of forming a frame having the metal layer and the polymer layer alternately layered by cutting the roll along a randomly selected direction of the roll at a predetermined thickness for a plurality of times.

Preferably, the metal layer may be configured as a film or configured by using any one of a plating method, a coating method, and a deposition method on the polymer layer, and the polymer layer may be configured as a film or configured by being deposited on the metal layer.

Preferably, the method may further include, after the second step of forming the roll by winding the deposition layer, a step of compressing the roll downwards along a perpendicular direction to a direction of an axis of the roll.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the exemplary embodiments of the present invention will be illustrated in the appended drawings and described in detail in the detailed description of the present invention. In describing the present invention, when it is determined that the detailed description on a related disclosed technology may cause ambiguity in the concept (or idea) of the present invention, the detailed description of the same will be omitted for simplicity.

The terms used in the description of the present invention are defined based on their corresponding functions within the present invention. And, since the meaning of such terms may vary in accordance with the intentions or practices of anyone skilled in the art, the definition of the terms used in the description of the present invention should be understood based on the overall context of this specification.

Although the metal frame mentioned in the present invention may mainly correspond to a finishing frame (outer cover) configuring an outer feature of a target device, the meaning of the term will not be limited only to this. And, therefore, the metal frame may also correspond to a D cover formed inside a finishing frame, and the metal frame may also refer to all forms of covers, cases, and so on, that are required for configuring other types of devices. Hereinafter, the case will be mostly described in this specification.

Furthermore, a device or apparatus that is mentioned herein refers to a concept including both a device receiving power, such as a mobile phone, and a device transmitting power, such as a charging device.

Reference will now be made in detail to the preferred embodiments of the present invention, examples of which are illustrated in the accompanying drawings. Wherever possible, the same reference numbers will be used throughout the drawings to refer to the same or like parts.

Figure 1:
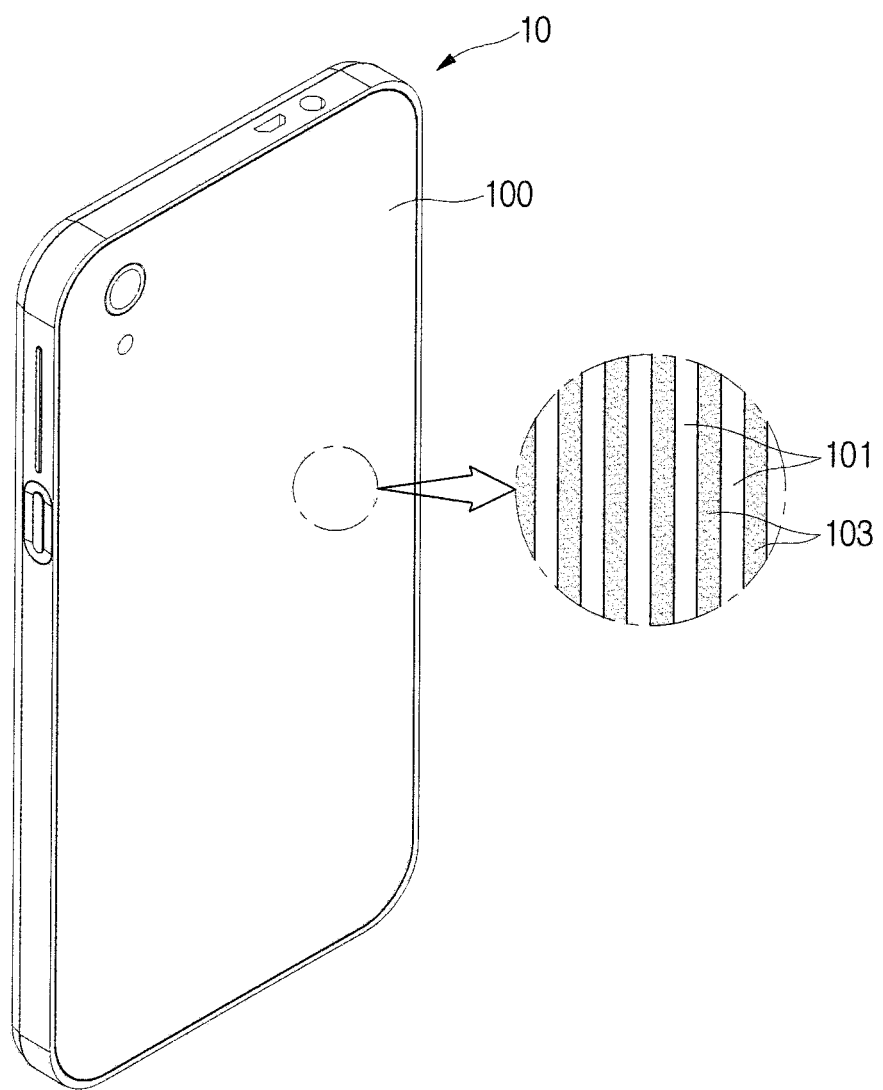
FIG. 1 illustrates an enlarged view of a frame being used as a case and its surface according to a preferred embodiment of the present invention.

FIG. 1 illustrates an enlarged view of a frame being used as a case and its surface according to a preferred embodiment of the present invention.

As shown in the drawing, even though a frame 100 includes metal, not only near field communication using a wireless module 110 but also wireless charging may be performed, and, by using the typical texture and solidity of metal, an improved sense of beauty and enhanced durability, which results from an increased solidity, may be expected in the product (e.g., mobile user equipments or mobile devices, and so on, applying the frame 100).

Such frame 100 may be configured to have an alternate layering of metal layers 101 and polymer layers 103.

Figure 2:
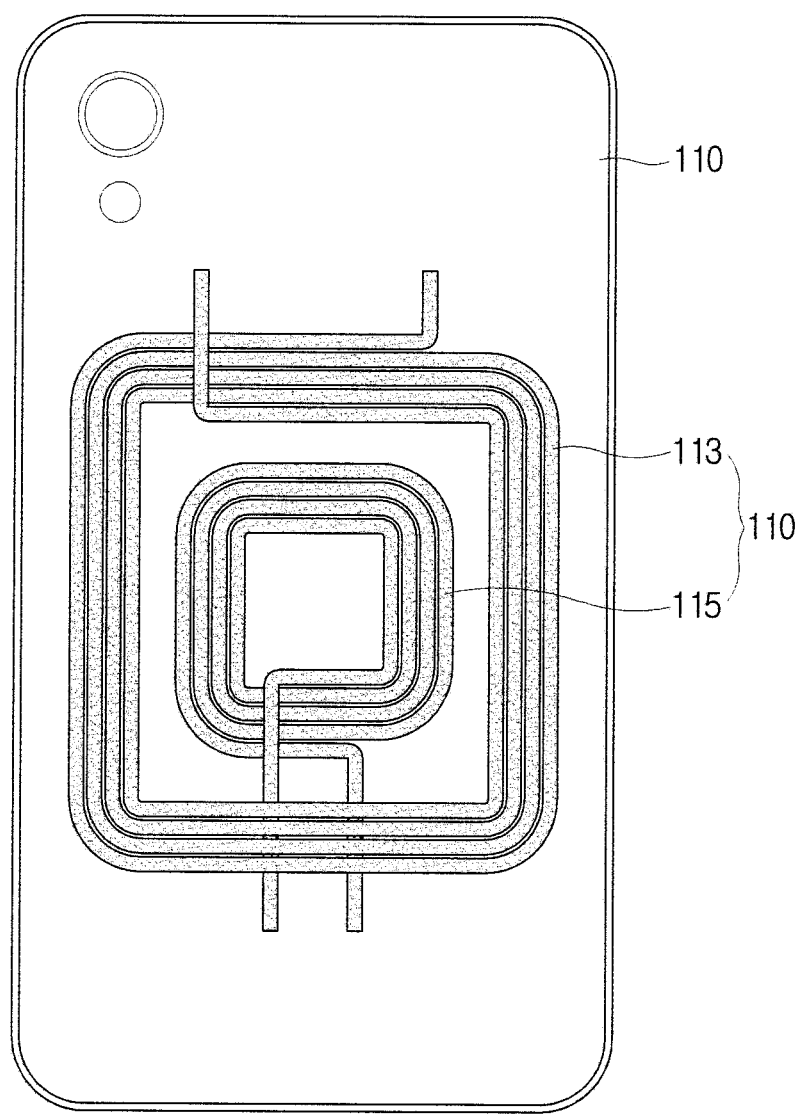
FIG. 2 illustrates a plane view for describing a wireless module according to a preferred embodiment of the present invention.

At this point, as shown in FIG. 2, it is preferable that the wireless module 110 corresponds to a near field communication unit 115 (e.g., NFC unit) and a wireless charging module 113 (transmitter or receiver).

As shown in the drawing, although it is preferable that such wireless module 110 is positioned at each of a central part and a peripheral part (or circumferential part) of the device, the present invention will not be limited only to this.

Although it is not shown in the drawing, the wireless modules may also be positioned side-by-side along a horizontal direction or a vertical direction.

Figure 9:
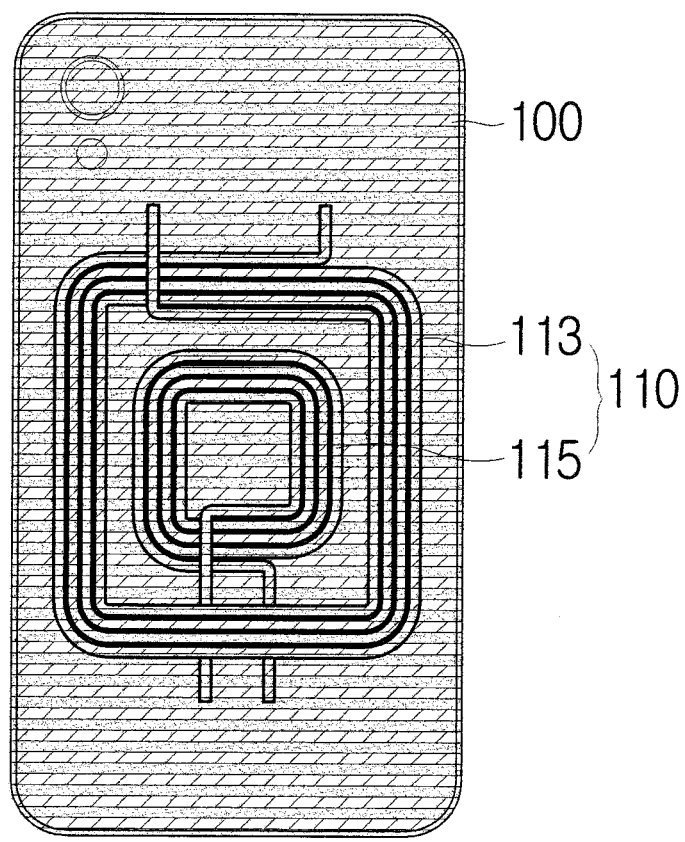
FIG. 9 illustrates a plane view for describing a size of a frame according to a preferred embodiment of the present invention.

The frame 100 according to the present invention is installed at a position corresponding to a main transmitting direction or a main receiving direction of the wireless charging module or the wireless communication module. Most particularly, it is preferable that the frame 100 is installed at a position corresponding to a main transmitting direction or a main receiving direction of the wireless power or wireless communication in at least one of device capable of performing wireless power transmission and wireless communication, wherein the frame 100 is installed to at least entirely cover the module performing the function of wireless power transmission or wireless communication. This is shown in FIG. 9.

When manufacturing the frame 100, as shown below, for example, a skin depth of the metal layer 101 may be considered. However, the skin depth is merely an example of reducing resistance of the metal layer 101. And, therefore, the metal layer 101 may be operated regardless of the skin depth. Nevertheless, in case the resistance becomes a critical issue, the skin depth shall become valid.

The above-described frame 100 is configured of an alternate layering of metal layers 101 and polymer layers 103. And, at this point, at least the metal layer 101 is configured to have a thickness or width that is equal to or less than a skin depth. And, in this case, it is preferable that the thickness is configured within a range of from sub nm to several μm.

Herein, the skin depth corresponds to a theory that is established in association with the power transmission, and, therefore, a detailed description of the skin depth is not required. Nevertheless, in order to facilitate the understanding of the present invention, the skin depth will hereinafter be briefly described.

The skin depth refers to a depth to which electromagnetic waves penetrate inside a matter (or material) on average and may also be referred to as a penetration depth.

The skin depth is related to a skin effect, which refers to a tendency of current density to become larger at a surface of a conductor rather than its center when electric current flows through the conductor.

When it is assumed that the conductor is formed to have a cylindrical shape and that the electric current flows through the conductor along its longitudinal direction, a distribution of the current density within the conductor is not uniform. Due to a large number of magnetic fluxes being linked to the electric current at the center of the conductor, inductance becomes partially larger.

As a cross-section and a conductivity of the frequency or the conductor become larger, the skin effect becomes greater. When it is assumed that an electric current I flows through a conducting wire, a magnetic field is generated in the conducting wire.

When this magnetic field is temporally changed, an electromotive force is generated along a direction obstructing (or disturbing) a change in the magnetic field due to Faraday's law of electromagnetic induction. An electric current Iw that is generated by the above-described electromotive force is referred to as an eddy current.

Theoretically, when the above-described eddy current is combined with the initial current, the eddy current is subtracted at the center (I−Iw), and the eddy current is added at the surface (I+Iw). Accordingly, the magnetic field inside the conducting wire becomes smaller at a fast rate.

Therefore, due to this phenomenon, the above-described skin effect occurs inevitably. Each matter (or material) has a unique threshold depth at which the skin effect becomes apparent, and this skin depth (or penetration depth) may act as an indicator defining the characteristics of the matter (or material).

Although the skin depth has a unique value in accordance with the matter (or material), as described above, the skin depth may vary even in the same matter (or material) depending upon the frequency, and, most particularly, the skin depth and the frequency establishes an inverse variation.

For example, based on 100 kHz, which corresponds to a bandwidth allowing wireless power transmission, the skin depth is measured to be equal to approximately 270 μm for aluminum (Al), approximately 200 μm for copper (Cu), approximately 30 μm for steel (steel 401), approximately 7.5 μm for iron-silicon alloy (Fe—Si), and approximately 1.3 μm for iron-nickel alloy (Fe—Ni). More specifically, when power is transmitted at an alternating current of 100 kHz, the skin effect is apparent at the above-mentioned skin depth or lower, and the flow of the electric current becomes more intense as it approaches the surface. Conversely, this indicates that an electric resistance R becomes smaller under the same voltage V. The present invention relates to limiting the thickness or width of a metal so that its electric resistance R can be reduced throughout the entire area of the case.

Figure 4:
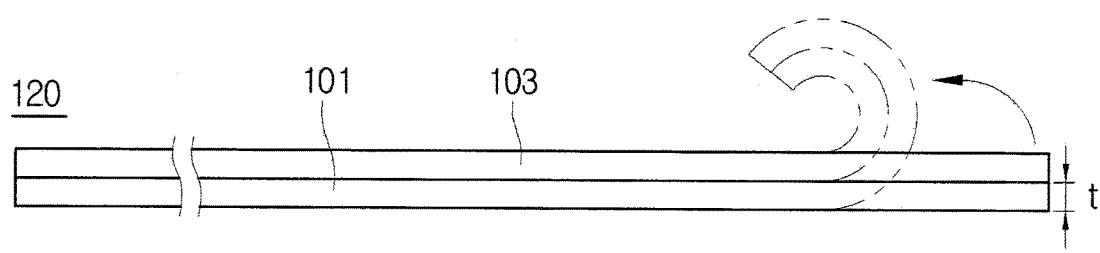
FIG. 4 illustrates a detailed view for describing a first step of the manufacturing process according to a preferred embodiment of the present invention.

Accordingly, when cutting a roll 130, which will be described later on, a width (d) is cut in accordance with the thickness (t of FIG. 4) of the metal layer 101. Herein, the thickness of the metal layer 101 may corresponds to a thickness of the frame or a value measured from a ground surface along a vertical direction for a longitudinal direction (or horizontal direction). In case the thickness of the metal layer 101 is equal to or less than the skin depth, since the durability of the frame 100 acting as the case may be weak, the width (d) is required to be at least equal to or greater than the skin depth, and in case the thickness of the metal layer 101 is equal to or greater than the skin depth, it is preferable that the width of the metal layer 101 is equal to or less than the skin depth, and this is preferable for reducing the resistance caused by the metal layer 101.

Figure 3:
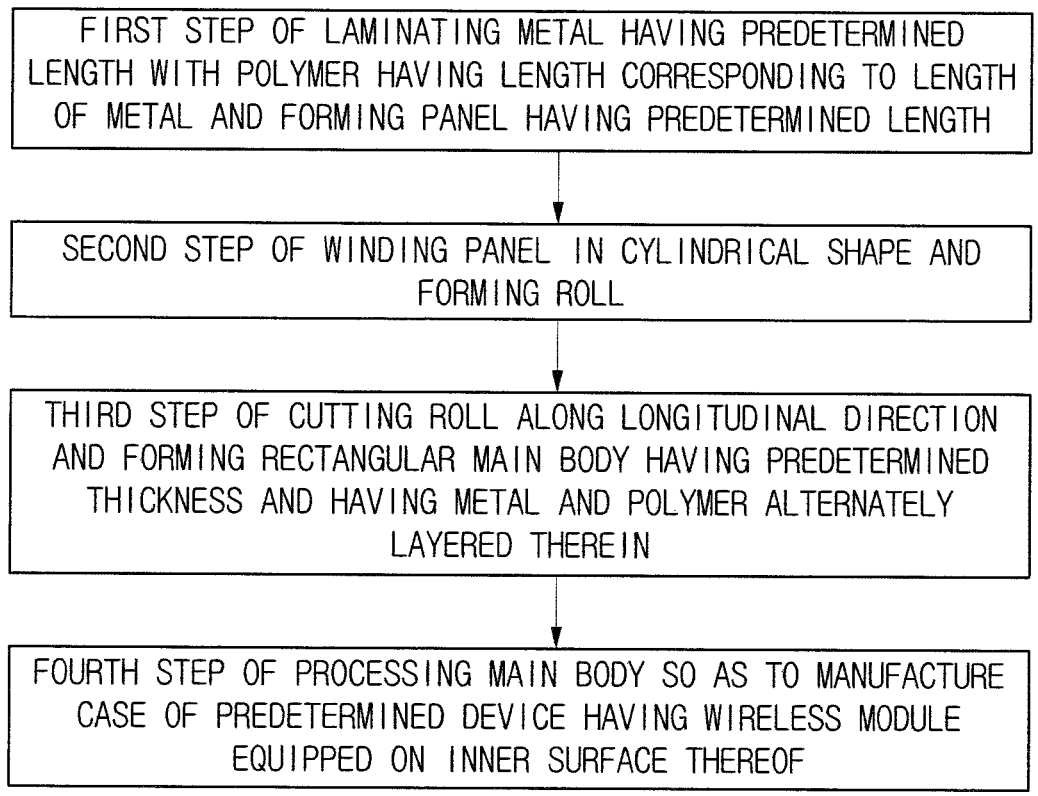
FIG. 3 illustrates a flow chart for describing a manufacturing process of a frame according to a preferred embodiment of the present invention.

The frame according to the present invention is manufactured in accordance with a process flow shown in FIG. 3. Hereinafter, the process flow will be described in detail with reference to the accompanying drawings.

FIG. 3 illustrates a flow chart for describing a manufacturing process of a frame according to a preferred embodiment of the present invention.

As shown in the drawing, the frame is manufactured by using a method, which is configured of a first step of forming a panel 120, a second step of forming a roll 130 by winding the panel 120, a third step of cutting the roll 130 along the longitudinal direction (or horizontal direction) and forming a main body 140 being configured of alternated layering of metal layers 101 and polymer layers 103, and a fourth step of manufacturing the frame 100 through a processing procedure.

Figure 5A:
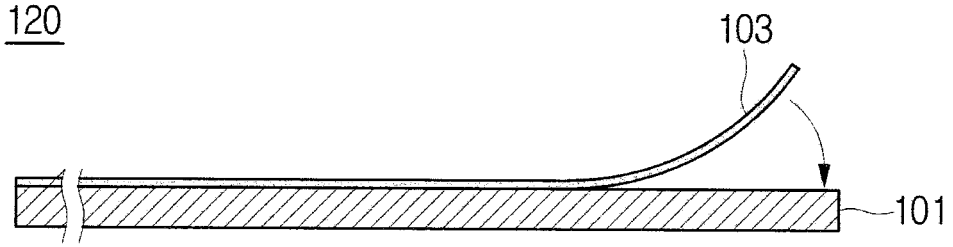
FIGS. 5A and 5B illustrate a detailed view for describing an exemplary polymer according to a preferred embodiment of the present invention.
Figure 5B:
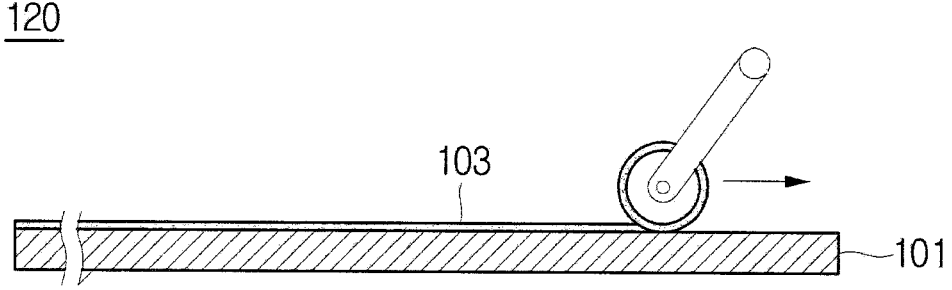

In the first step, as shown in FIGS. 5A and 5B, a metal layer 101 having a predetermined length and a polymer layer 103 having a length corresponding to the length of the metal layer 101 are laminated, in order to form the panel 120 having a predetermined length.

As shown in FIG. 5A, the polymer layer 103 may correspond to a film having a thickness that is smaller than the metal layer 101, or, as shown in FIG. 5B, the polymer layer 103 may exist as a coating material, an adhesive material, and so on, that is deposited on a surface of the metal layer 101. Herein, the polymer layer 101 may be thicker than the metal layer 101. Nevertheless, in order to provide a metallic texture, it is preferable that the thickness of the polymer layer 103 is configured to be thinner. However, it is preferable that the thickness of the polymer layer 103 is thick enough to perform winding (or rolling).

More comprehensively, the metal layer 101 may be configured as a film or may be configured by using any one of a plating method, a coating method, and a deposition method on the polymer layer 103. And, the polymer layer 103 may be configured as a film or may be formed by having a substance deposited on the metal layer 101.

The above-described polymer layer 103 exists between metal layers, as an insulator (or isolator), so that the thickness of the metal layer 101 can be divided. Therefore, it is preferable to minimize the exposure of the polymer layer 103 so as to prevent the polymer layer 103 from being easily recognized (or identified) by the naked eye. At this point, the width of the polymer layer 103 may range between several nanometers to several micrometers. In case the thickness of the polymer layer 103 exceeds the above-mentioned range, it will be disadvantageous in that the polymer layer 103 can be easily and clearly recognized by the naked eye.

Therefore, even though the frame 100 according to the present invention is configured of alternated layering of polymer layers 103 and metal layers 101, the frame 100 is configured so that the metal layer 101 region is mainly recognized, thereby allowing an increased sense of beauty to be gained and the durability to be enhanced by using the metal layer 101.

Figure 6A:
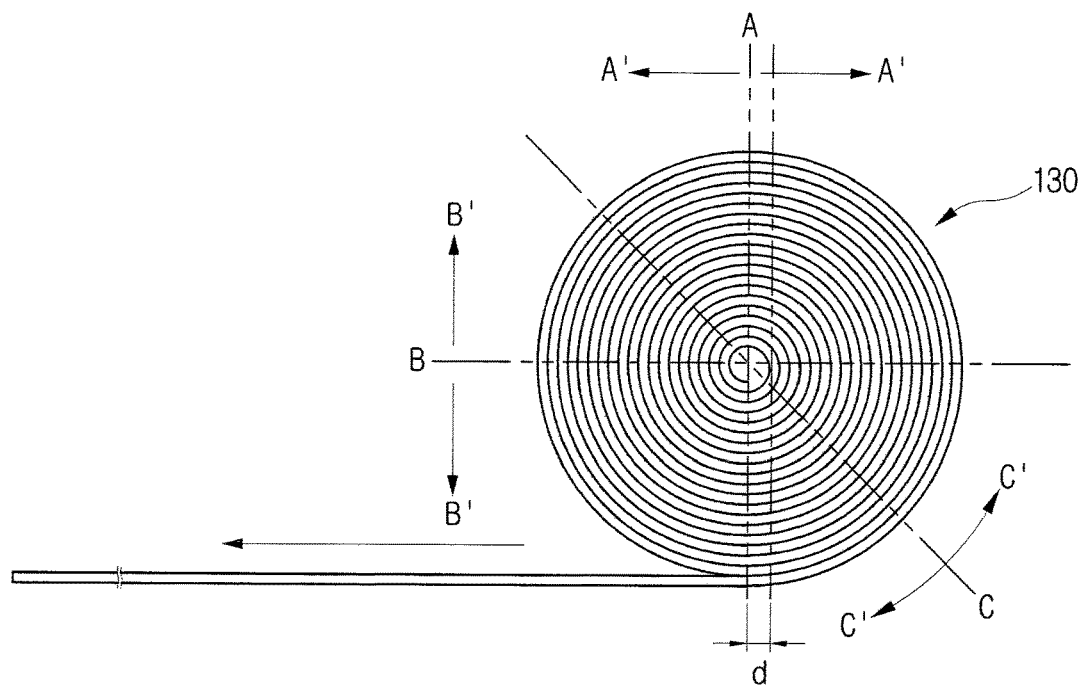
FIGS. 6A and 6B illustrate a detailed view for describing a second step of the manufacturing process according to a preferred embodiment of the present invention.
Figure 6B:
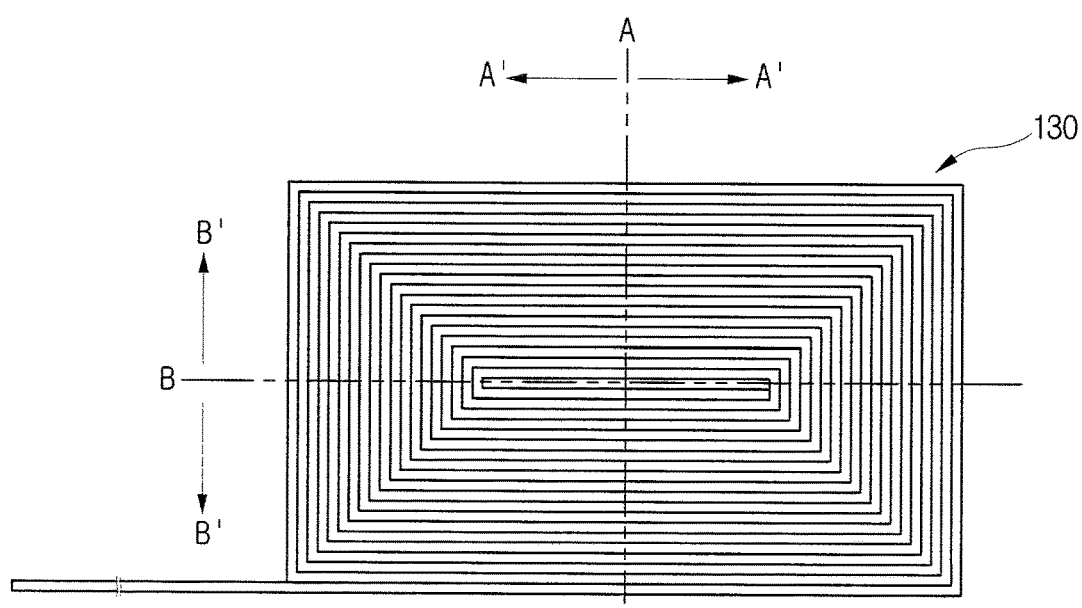

After performing the first step, the panel 120 is configured as a roll after winding the panel 120 into a cylindrical form, as shown in FIGS. 6A and 6B.

At this point, the roll 130 is not limited to be configured in a cylindrical form only. As shown in FIG. 6A, the roll 130 may be configured to have a cylindrical form, and, as shown in FIG. 6B, the roll 130 may also be process with winding into a rectangular form. Additionally, after being processed with winding, the roll 130 may be compressed. Furthermore, deformation of the roll 130 may occur during the compression process.

The above-described roll 130 is configured so that the layering of the metal layer 101 and the polymer layer 103 can be alternated. And, accordingly, a frame being configured of an alternated layering of metal layers 101 and polymer layers 103 is manufactured by cutting the roll 130 along a direction, which is randomly selected from the roll 130, for a plurality of times at a predetermined thickness.

Figure 7:
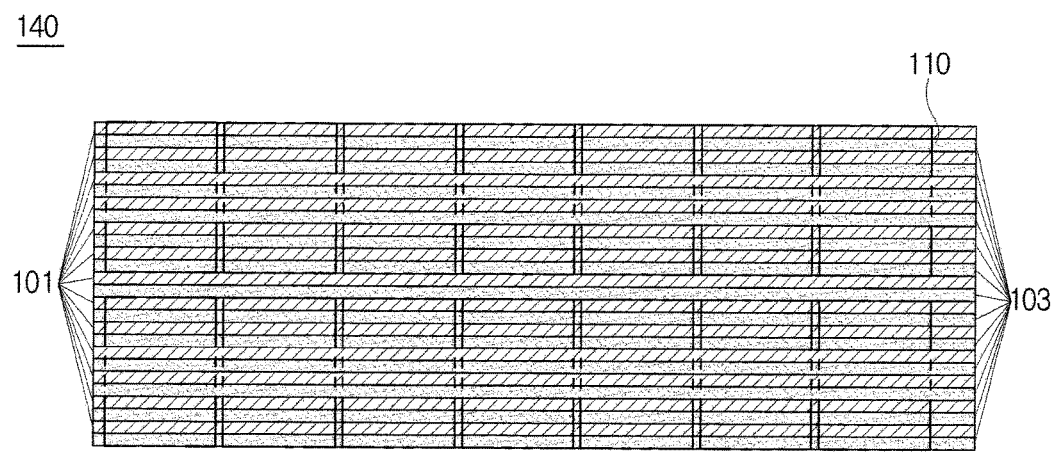
FIG. 7 illustrates a detailed view for describing a main body according to a preferred embodiment of the present invention.

More specifically, for example, as shown in FIG. 6A, by configuring any one of directions A, B, and C as the cutting direction, a frame having a cross-section, as shown in FIG. 7, may be manufactured. Evidently, a direction other than directions A, B, and C may also be selected as the cutting direction. In case the roll 130 is configured to have a cylindrical form, as shown in FIG. 6B, the roll 130 may be cut along a horizontal line A'-A', wherein a left-side A' and a right-side A' are spaced apart from one another at equal distances based on axis A, or the roll 130 may be cut along a vertical line B'-B', wherein an upper side B' and a lower side B' are spaced apart from one another at equal distances based on axis B, or the roll 130 may be cut along a circumferential line C'-C', wherein a first C' and a second C' are spaced apart from one another at equal distances based on axis C.

Additionally, in case the roll 130 is configured to have a rectangular form, as shown in FIG. 6B, the roll 130 may be cut along a horizontal line A'-A', wherein a left-side A' and a right-side A' are spaced apart from one another at equal distances based on axis A, or the roll 130 may be cut along a vertical line wherein an upper side B' and a lower side B' are spaced apart from one another at equal distances based on axis B.

In relation to the above-described cutting direction, the cutting process may be performed along a longitudinal direction (or horizontal direction) along which a virtual axis, which is formed when forming the roll, is extended, or the cutting process may be performed along a vertical direction that is perpendicular to the longitudinal direction of the virtual axis, or the cutting process may be performed at an angle between the longitudinal direction of the virtual axis and its vertical direction (or perpendicular direction).

At this point, although it is preferable to cut and use only a region of the roll 130 where the thickness of the metal layer 101 is consistently maintained, the present invention will not be limited only to this. Herein, when considering only the presence or absence of the function of transmitting electric waves or power, such thickness is not required to be taken into consideration. In other words, only the issue of whether or not the meal and polymer are alternately layered may be considered herein.

A main body, which is formed by the above-described process of cutting the roll, is configured of an alternated layering of metal layers 101 and polymer layers 103, and a detailed description of the same will hereinafter be presented with reference to FIG. 7.

FIG. 7 illustrates a detailed view for describing a main body according to a preferred embodiment of the present invention.

As shown in FIG. 7, the main body 140 is configured of an alternated layering of metal layers 101 and polymer layers 103. The main body 140 is used as a material for the frame 100, and, as shown in the drawing, the main body 140 may be processed to configure at least one frame 100.

Figure 8:
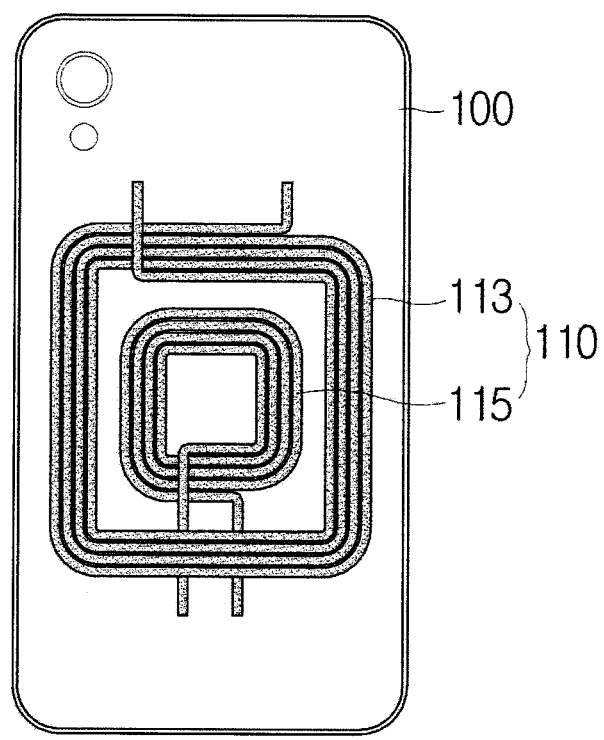
FIG. 8 illustrates a plane view for describing a fourth step of the manufacturing process according to a preferred embodiment of the present invention.

A plurality of frames 100 may be manufactured by a separate process, and, since a wireless module 110 is embedded in the manufactured frame 100, as shown in FIG. 8, the manufactured frame 100 may be provided as a frame 100 for a device. And, for example, as shown in the drawing, by having a near field communication module 115 and a wireless charging module 113 embedded therein, the manufactured frame 100 may be provided as a back cover for a mobile phone.

Meanwhile, a plurality of frames 100 may be used by depositing one frame over the other, and, in this case, an insulating layer may be formed in at least one portion between each frame 100. And, herein, it is preferable that the insulating layer corresponds to any one of air, film, and coating layer. This is to prevent the occurrence of a short circuit, which is caused by contact between upper and lower metal layers 101.

By configuring each of the lower frame and the upper frame to have a different color, the color of the lower frame may be recognized (or identified) through the polymer layer of the upper frame. In this case, the polymer layer 103 of the upper frame shall be transparent. This is because, if the polymer layer 103 is non-transparent, the power layer cannot be seen from the upper frame.

When depositing the upper frame and the lower frame, the polymer layer 103 of the lower frame may be configured to match a lower surface of the metal layer 101 of the upper frame so that the polymer layer 103, which is formed on the lower frame, can be hidden. In this case, even if the polymer layer 103 of the upper frame is transparent, the polymer layer 103 of the lower frame is not exposed. When depositing multiple frames one over the other, this is to facilitate color adjustment of the frames or to maximize the metallic texture of the frames. Evidently, in this case, the width of the metal layer 101 and the width of the polymer layer 103 shall be equal or similar to one another.

As described above, the frame for a device capable of transmitting electric waves and the manufacturing method of the same have the following advantages. According to an exemplary embodiment of the present invention, for example, a mobile device including at least one wireless charging receiver and being capable of performing wireless charging accordingly, may be expected to perform the wireless charging more easily despite having its external feature configured of a metallic material having a more excellent and luxurious texture and having a more enhanced durability.

Also, according to the present invention, a new sense of beauty in the external features may be expected to be added by layering polymer between metal layers, and, most particularly, metallic texture may be expected to be to the frame, in case the frame is configured of extremely thin polymer, and electric waves may be expected to be transmitted despite the metallic properties of the frame.

Furthermore, according to the present invention, by providing a simple manufacturing method of a frame, which is configured by alternately layering metal and polymer, the manufacturing method may be expected to be suitable for mass production.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

What is claimed is:

1. A frame for an electronic device being capable of transmitting electric waves, the frame comprising:
   a lower frame; and
   an upper frame deposited on the lower frame,
   wherein each of the upper and lower frames includes an alternated layering of metal layers and polymer layers, and
   the metal layers and the at least one polymer layers of each of the upper and lower frames are alternately layered on a surface of each of the upper and lower frames, and
   wherein an insulating layer is formed between the upper and lower frames to prevent the metal layers of the upper frame from contacting the metal layers of the lower frame.

2. The frame of claim 1, wherein the frame is applied to the electronic device including a wireless charging module or a wireless communication module, and
   wherein each of the modules is selected from at least one of a charging transmitter, a charging receiver, and a near field communication module.

3. The frame of claim 2, wherein the frame is installed at a position corresponding to a main transmitting direction or a main receiving direction of the wireless charging module or the wireless communication module.

4. The frame of claim 1,
wherein the insulating layer comprises any one of air, a film, and a coating layer.

5. The frame of claim 1, wherein each of the upper frame and the lower frame is configured to have a different color, and
wherein the polymer layers of the upper frame are transparent such that the color of the lower frame is capable of being recognized through the polymer layers of the upper frame.

6. The frame of claim 1, wherein upper surfaces of the polymer layers of the lower frame are configured to face lower surfaces of the metal layers of the upper frame, such that the polymer layers of the lower frame are concealed.

7. The frame of claim 1, wherein each of the metal layers has a thickness less than or equal to a skin depth.

8. The frame of claim 1, wherein a thickness of each of the metal layers is equal to the thickness of the frame or equal to a value measured from a perpendicular direction to a longitudinal direction of a surface of each metal layer.

9. The frame of claim 1, wherein the frame is installed at a position corresponding to a main transmitting and/or receiving direction of wireless power and wireless communication in at least one device capable of performing wireless power transmission and wireless communication.

10. The frame of claim 1, wherein the polymer layers of the lower frame are aligned with the metal layers of the upper frame to be covered by the metal layers of the upper frame.

11. The frame of claim 1, wherein a wireless charging module and/or a wireless communication module is embedded in the frame.

12. A manufacturing method of a frame for an electronic device being capable of transmitting electric waves, the method comprising:
forming a deposition layer including a metal layer and a polymer layer by laminating the metal layer and the polymer layer each having a plate form, or by forming the metal layer on the polymer layer or forming the polymer layer on the metal layer;
forming a roll by winding the deposition layer;
deforming the roll by compressing the roll in a direction perpendicular to an axis of the roll; and
forming a plurality of frames each having the metal layers and the polymer layers alternately layered on each surface thereof by cutting the wound deposition layer of the roll along a randomly selected direction of the roll with a predetermined thickness for a plurality of times.

13. The method of claim 12, wherein the metal layer comprises a film or is formed by using any one of a plating method, a coating method, and a deposition method on the polymer layer, and
wherein the polymer layer comprises a film or is formed by being deposited on the metal layer.

14. The method of claim 12, further comprising depositing the plurality of formed frames.

15. The method of claim 14, further comprising embedding a wireless charging module and/or a wireless communication module in the formed frame.

* * * * *